United States Patent
Von Beckh

[11] 3,826,434
[45] July 30, 1974

[54] PELVIS AND LEGS ELEVATING G-PROTECTIVE SEAT

[76] Inventor: Harald J. Von Beckh, P.O. Box 1220, Hatboro, Pa. 18974

[22] Filed: May 18, 1973

[21] Appl. No.: 361,730

[52] U.S. Cl............................................ 244/122 R
[51] Int. Cl........................................... B64d 25/02
[58] Field of Search ..... 244/122 R, 122 A, 122 AB, 244/122 AC, 122 AD, 122 AE, 122 AF, 122 AG, 118 P; 297/61, 83, 216, 316, 317, 318, 330; 248/398, 421; 5/66, 68

[56] References Cited
UNITED STATES PATENTS

| | | | |
|---|---|---|---|
| 339,477 | 4/1886 | Scarritt | 297/61 |
| 3,089,150 | 5/1963 | Briggs | 5/68 |
| 3,191,196 | 6/1965 | Holm | 297/330 |
| 3,300,794 | 1/1967 | Altorfer | 5/68 |
| 3,406,772 | 10/1968 | Ahrent | 5/68 |
| 3,620,568 | 11/1971 | Morrow | 297/316 |
| 3,644,946 | 2/1972 | Swatt | 5/68 |

Primary Examiner—Robert J. Spar
Assistant Examiner—Gary L. Auton
Attorney, Agent, or Firm—R. S. Sciascia; Henry Hansen

[57] ABSTRACT

A pelvis and legs elevating (PALE) acceleration-protective seat for positioning an occupant within a vehicle in either a sitting position or a supine position while maintaining unobstructed forward vision out of the vehicle. At a preselected acceleration level substantially along the spinal axis of the occupant in the sitting position, the seat elevates the pelvis and legs while the head remains stationary relative to the vehicle.

13 Claims, 4 Drawing Figures

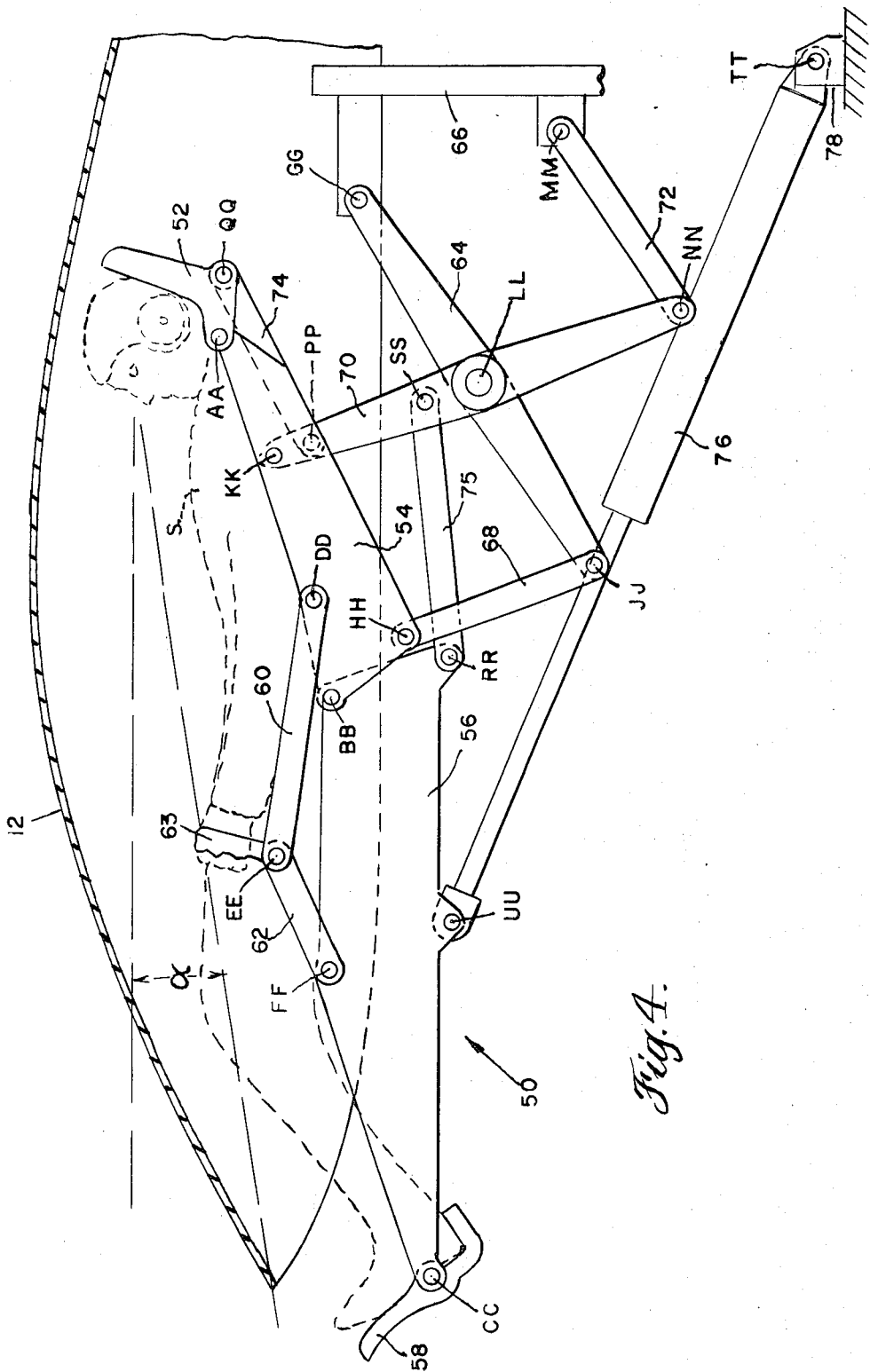

PELVIS AND LEGS ELEVATING G-PROTECTIVE SEAT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to vehicular seats and more particularly to supinating seats for vehicles subject to accelerations along the direction of motion and along the vertical axis of the vehicle.

High performance aircraft, particularly those having catapult takeoff and arrested landing capabilities subject the pilot to relatively high accelerations or G-loads in the direction of the flight path. The pilot, sitting in a substantially upright position, can withstand these accelerations without any serious degradation in his performance. However, with increases in structural strength, maneuverability and power of aircraft, the pilot is also subjected to very high radial accelerations caused by curved trajectories of the aircraft, such as sharp turns or steep pullouts from dives. This has significantly increased the probability of grayout, blackout or loss of consciousness of the pilot because his spinal axis in the sitting position is in the same direction as the radial acceleration.

Recognizing that a pilot can tolerate considerably higher G loads for sustained periods if positioned with his retinal-aortic line perpendicular to the G vector, various types of reclining or supinating seats have been developed in the prior art to position the pilot in the upright position for takeoff and landing, and in the supine position for radial acceleration. Supinating seats of this type are disclosed in U.S. Pat. No. 2,304,781 to Dillon and U.S. Pat. No. 3,098,631 to Hall et al. and generally include a reclining backrest which moves the pilot's head downward and backward in the cockpit. The downward movement lowers the pilot's eye position within the aircraft thereby reducing his field of view forward of the windshield and impairing his ability to read instrument displays, such as the attitude gyro, due to parallax. The backward movement is equally undesirable where head-up displays at the front of the windshield require a fixed focal distance to the pilot's eyes. In addition to these visual impediments, movement of the head in the high-G environments contemplated for the present invention can cause labyrinthine symptoms such as vertigo and disorientation.

SUMMARY OF THE INVENTION

Accordingly, it is a general purpose and object of the present invention to provide a G-protective seat for a vehicle which is movable between a normally upright position within the vehicle to a supine position substantially perpendicular to radial accelerations of the vehicle while maintaining the same forward field of view outside the vehicle and the same visibility of displays. Another object of the invention is to provide a supinating seat in which the head is maintained in substantially the same position within the vehicle to preclude labyrinthine symptoms. Still another object of the invention is to provide a G-protective seat in which the pelvis and legs of the operator are moved generally forwardly and upwardly. A still further object of the invention is to provide a novel supinating seat which is simple and reliable, which is relatively inexpensive to manufacture and fabricate, and which is particularly suited for high performance aircraft.

Briefly, these and other objects, advantages and novel features of the invention are accomplished with a seat segmented along its length into discrete body-supporting surfaces connected by an arrangement of linkages for elevating the pelvis and legs of the occupant while maintaining the head substantially stationary relative to the aircraft.

In one embodiment, a seatrest acts as a connecting rod between motor-driven cranks, and a backrest, headrest and legrest articulate therefrom. As the seatrest moves forward and upward, the lower backrest and legrest recline and the upper backrest moves to maintain the occupant's head substantially stationary.

In another embodiment, the backrest is reclined by a pantograph-type mechanism through a motor-driven seatrest operatively connected thereto. As the backrest reclines, a headrest moves in a direction for maintaining the occupant's head substantially stationary.

BRIEF DESCRIPTION OF THE DRAWING

FIG. 4 represents the G-protective seat of FIG. 3 in a supine position.

DESCRIPTION OF THE PREFERRED EMBODIMENTS

Figure 1:
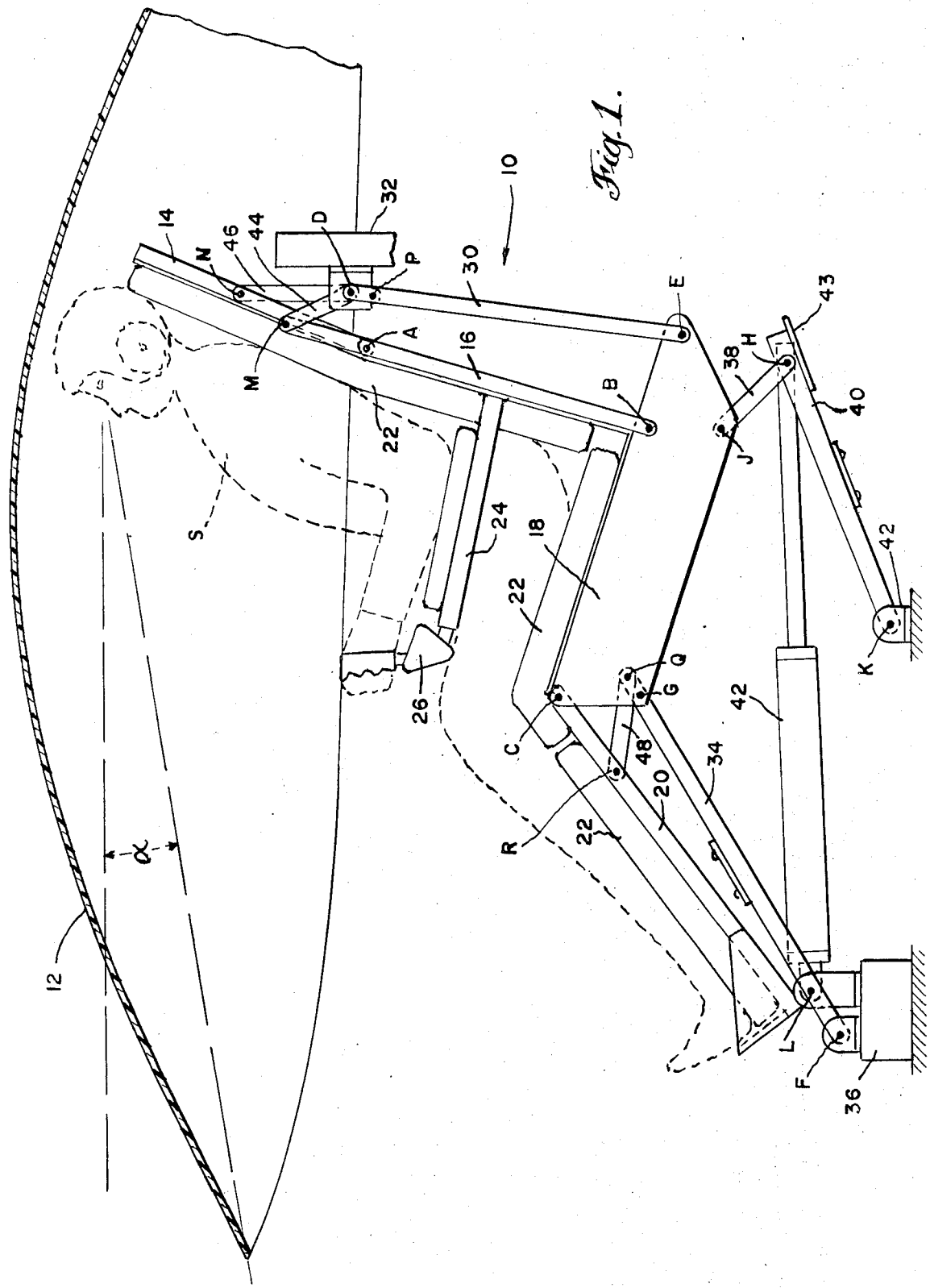
FIG. 1 represents a side elevation view of one preferred embodiment of a G-protective seat constructed according to the invention in an upright position within an aircraft.
Figure 2:
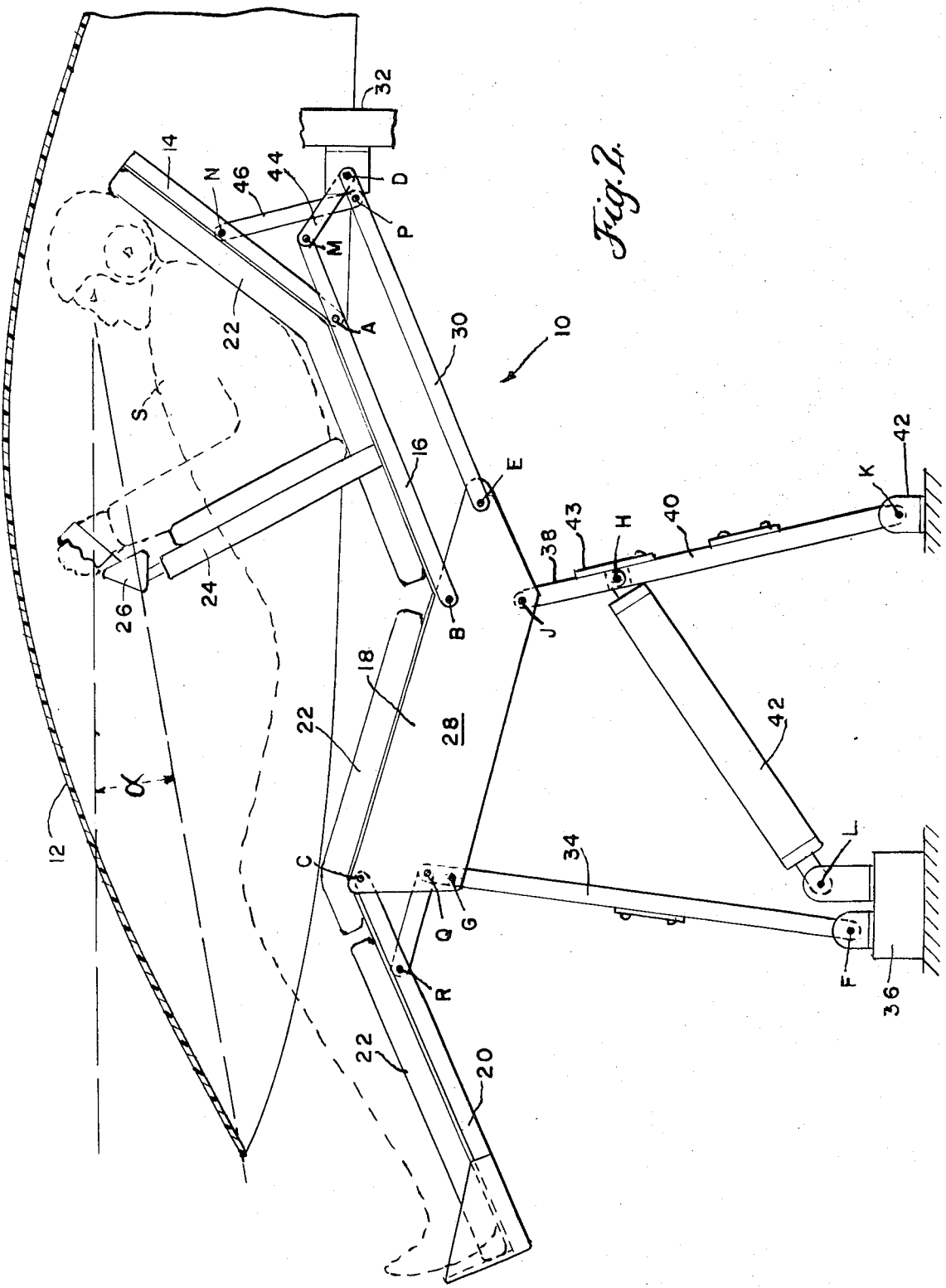
FIG. 2 represents the G-protective seat of FIG. 1 in a supine position.

Referring now to the embodiment of FIGS. 1 and 2, there is shown a G-protective seat 10 in the normal, upright position and in the supine position mounted in an aircraft, only a portion of the cockpit canopy 12 being shown relative thereto.

The seat 10 is segmented along its length into four body-supporting surfaces, each being pivotally connected to its adjacent surface for articulation relative thereto in a plane normal to the supporting surfaces and parallel to the longitudinal axis of the seat 10. These surfaces are hereinafter referred to as headrest 14, backrest 16, seatrest 18, and legrest 20, and include cusions 22 for reducing shock and concentrated stresses on the body of an occupant S, shown in dotted outline.

The pivotal connections between adjacent body-supporting surfaces are selected to cause bending at the upper vertebrae, pelvis and knees of occupant S so that his posture can be changed from a sitting position with the head erect to a substantially outstretched position with the head tilted forward from the vertebrae. More particularly, headrest 14 and backrest 16 are pivoted along axis A adjacent to the upper vertebrae of occupant S, backrest 16 and seatrest 18 are pivoted along axis G adjacent to the occupant's pelvis, and seatrest 18 and legrest 20 are pivoted along axis C adjacent to the occupant's knees. Additional support is provided for the occupant's arms by left and right armrests 24 (only the left armrest being shown) fixed to and extending forwardly from backrest 16. Handgrip controls 26 may be attached to the armrests 24 in any position within convenient reach of the occupant and oriented such that they do not require finger or hand movement along the G vector.

A follower rod 30 is pivotally connected at one end to rigid aircraft structure at an axis D located behind seat 10 near axis A, and the other end is pivotally connected to seatrest 18 at axis E located rearward of axis B. A crank 34 pivotally connects at one end to rigid aircraft structure 36 at an axis F located on the floor of the cockpit forward of seatrest 18, and the other end pivotally connects to seatrest 18 at axis G located beneath the axis C. The precise locations of the axes are selected so that seatrest 18 inclines downwardly from front to rear over its total excursion between the upright position of FIG. 1 and the supine position of FIG. 2.

Toggle links 38 and 40 are pivotally connected to each other at an axis H between axes J and K located, respectively, in seatrest 18 below axis B and in aircraft structure 42 rearward of axis F. The distance between axes J and H and H and K are determined, within the limits of motion permitted seatrest 18, for a desired total vertical excursion. An extensible motor 42 pivotally connected between structure 36 at an axis L and toggle links 38 and 40 at axis H maintains the seat 18 in the lower (sitting) position when the motor is fully extended and in the upper (supine) position when retracted. A stop 43 extending from linkage 40 limits the rotation of the toggle link 38 from an acute angle with linkage 40 (FIG. 1) to a coextensive position (FIG. 2).

Backrest 16 is pivoted about the axis B relative to seatrest 18 by a connecting rod 44 pivotally connected between axis D on aircraft structure 32 and backrest 16 at axis M located above axis A. A connecting rod 46 is also pivotally connected between the aircraft structure 32 and the headrest 14 at axis D and axis N, respectively. The particular location of the axes M and N relative to axes A and D are selected so that the headrest 14 and backrest 16 will maintain the occupant's eyes substantially fixed relative to the aircraft.

As the seatrest 18 is moved from its lower to upper positions, the legrest 20 is also articulated so that the angle formed by the upper and lower leg portions of the occupant about the knee increases. This is accomplished by a connecting rod 48 pivotally connected between crank 34 at an axis Q located above axis G, and an axis R located below axis C on legrest 20. The particular locations of axes P and Q relative to axes C and G are determined by the angular rotation of legrest 20 desired with the movement of seat 10 between the upright and supine positions.

Operation of the supinating seat 10 will now be summarized with reference to FIGS. 1 and 2. In the upright position of FIG. 1, the occupant S is in a normal sitting position with a downward vision out of the canopy 12 represented by the angle $\alpha$. Motor 42 is fully extended with crank 34 and link 40 in their maximum clockwise positions about axes F and K. Seatrest 18 is therefore in its lowest position with headrest 14, backrest 16 and legrest 22 in their uprightmost positions. In this posture, the occupant S is most adaptable to accelerations along the direction of the vehicle.

As motor 42 retracts in response to manual or automatic command control, crank 34 and link 40 rotate counterclockwise about axes F and K causing seatrest 18 to move forwardly and upwardly. As this occurs, backrest 16 and legrest 22 rotate clockwise about axes B and C, while headrest 14 rotates counterclockwise about axis A. FIG. 2 shows motor 42 fully retracted and the occupant S in the maximum supine position in which he is most adaptable to vertical accelerations relative to the vehicle. It will be noted that in this position the occupant's downward vision out of the canopy 12 is still substantially at the same angle $\alpha$. That is, his eye position has remained substantially fixed relative to the vehicle.

Figure 3:
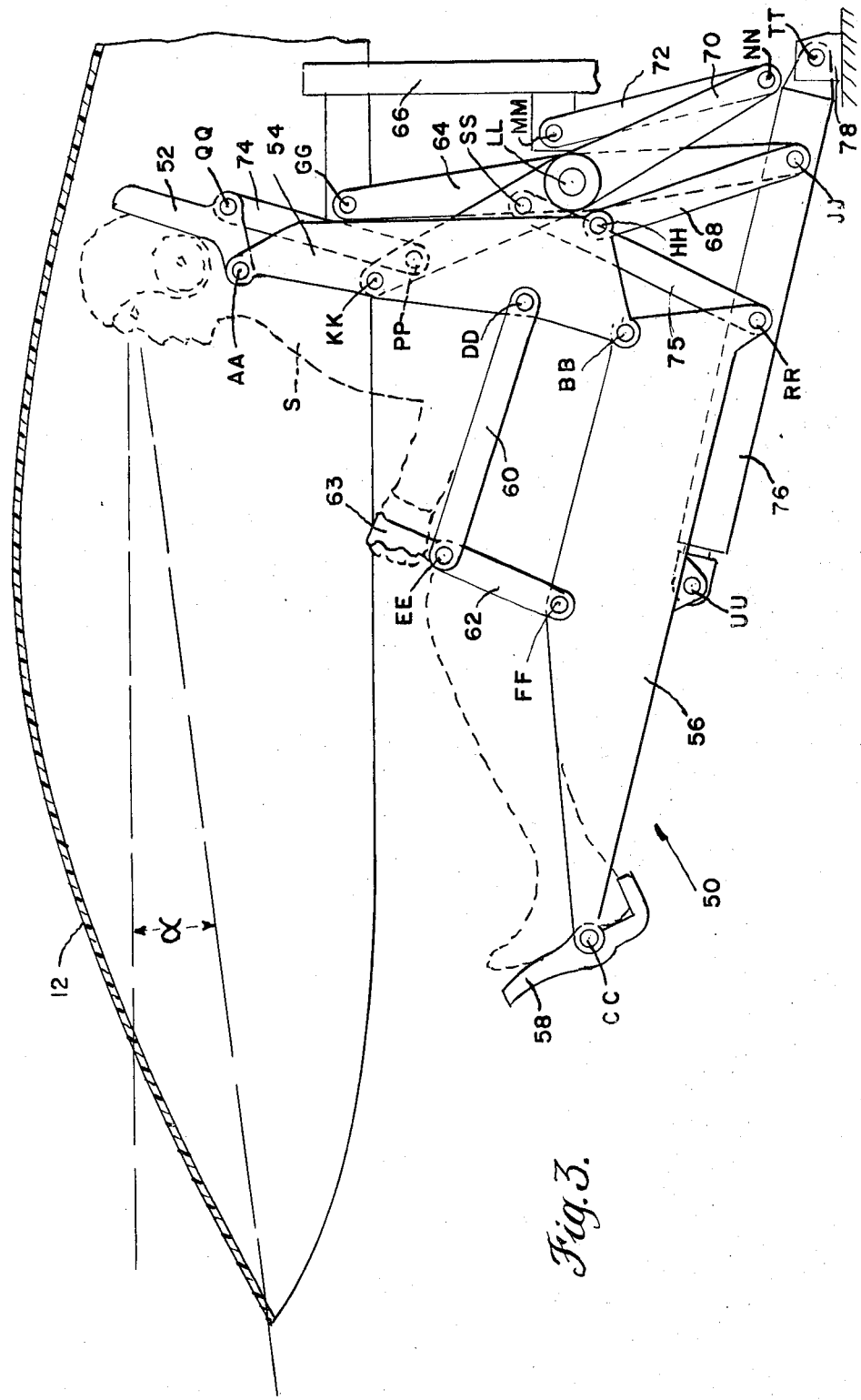
FIG. 3 represents an elevation view of another preferred embodiment of a G-protective seat constructed according to the invention in an upright position within an aircraft.

Referring now to the embodiment of FIGS. 3 and 4, there is shown a G-protective seat 50 in the upright and supine positions, respectively, mounted in the aircraft relative to the cockpit canopy 12.

The seat 50 includes a body-supporting surface segmented along its length into four surfaces, each pivotally connected to its adjacent portion like seat 10, supra. These portions are hereinafter referred to as headrest 52, backrest 54, seatrest 56, and footrest 58. Each of the rests may include cushions, not shown, for reducing shock and concentrated stresses on the occupant S.

The pivotal connections between the adjacent headrest, backrest and seatrest are selected to substantially coincide with the neck, and pelvis of the occupant S. More particularly, headrest 52 and backrest 54 are pivoted along axis AA adjacent to the occupant's neck, and backrest 54 and seatrest 56 are pivoted along axis BB adjacent to the occupant's pelvis. Footrest 58 is pivoted along axis CC beneath the occupant's feet. Additional support is provided for the occupant's arms by right and left armrests 60 (only the left armrest being shown) pivotally connected to the backrest 54 at axis DD and to one end of link 62 at axis EE, the other end thereof being pivotally connected to seatrest 56 at axis FF. A handgrip control 63 is conveniently attached to armrest 60.

Seat 50 is articulated from aircraft structure by a pantograph-type linkage in which the backrest 54 is moved between the upright position of FIG. 3 to the supine position of FIG. 4. One end of a crank 64 is pivotally connected at an axis GG to fixed aircraft structure 66. A connecting rod 68 is pivotally connected between its ends at axes JJ and HH, respectively, at the lower end of backrest 54 and the other end at crank 64. Another connecting rod 70 pivotally connects to backrest 54 intermediate its ends at axis KK and to crank 64 intermediate its ends at axis LL. Another crank 72 is pivotally connected at its ends between fixed aircraft structure 66 and an extension of rod 70, respectively, located at axes MM and NN. The precise locations of the axes relative to each other are selected so that the backrest 54 supports the occupant's back in a substantially upright position when the linkage elements 64, 68, 70 and 72 are folded against each other, and in a substantially reclining or supinating position when extended.

Articulation of the headrest 52 is determined by a connecting rod 74 pivotally connected at its ends at axes PP and QQ located on connecting rod 70 and headrest 52, respectively. The location of these axes with respect to each other is selected so that the headrest 52 remains substantially in the same position and orientation while backrest 54 rotates about axis AA.

A connecting rod 75 is pivotally connected at its ends between seatrest 56 and rod 70 at axes RR and SS, respectively, for causing the seatrest to rotate about axis BB relative to backrest 54. The location of axes RR and SS are selected to maintain a relatively small angular change as the lower end of backrest 54 moves.

An extensible motor 76 pivotally connected between aircraft structure 78 at axis TT and seatrest 56 at axis UU maintains the seat in the lower position when the motor is fully retracted and in the upper position when extended.

As noted in the summary of operation of seat 10, it should also be apparent in the operation of seat 50 that the downward vision out of the canopy 12 by the occupant, as represented by the angle α, remains substantially constant in both the upright position of FIG. 3 and the supine position of FIG. 4.

Some of the many advantages of the invention should now be apparent. In synthesis, a novel G-protective seat has been disclosed which s particularly suitable for vehicles imparting accelerations to its occupants along the direction of motion and along the vertical axis of the vehicle. The head of the occupant is maintained substantially stationary relative to the vehicle while the seat moves the occupant between an upright sitting position and supine position. In this manner, the occupant's field of view outside of the vehicle and his visibility of instrument and head-up displays are unchanged. The occupant is also protected thereby from labyrinthine symptoms such as vertigo and disorientation.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A G-protective seat for an occupant in a vehicle, comprising, in combination:
    a seat divided along its length into an upper, middle and lower segments for supporting the head, back and legs-and-pelvis areas, respectively, of the occupant, each segment being pivotally connected to its adjacent segment on an axis parallel to the supporting surfaces of the segments and normal to the longitudinal axis of said seat;
    linkage means formed to be pivotally mounted to vehicular structure and operatively connected to said seat for concomitantly articulating said segments from a first position supporting the occupant in a normally upright position to a second position supporting the occupant in a supine position while maintaining the head of the occupant substantially stationary relative to the vehicle; and
    motor means formed to be mounted on aircraft structure and drivingly connected to said seat for moving said seat between the first and second positions.

2. A seat according to claim 1 wherein said lower segment further comprises:
    a seatrest for supporting the pelvis area of the occupant; and
    a legrest pivotally connected to the forward position of said seatrest on an axis parallel to the supporting surfaces of said seatrest and said legrest and normal to the longitudinal axis of said seat.

3. A seat according to claim 2 wherein said linkage means further comprises:
    a crank formed to be pivotally connected at one end to vehicular structure, the other end being pivotally connected to the forward portion of said seatrest;
    toggle link means formed to be pivotally connected at one end to vehicular structure behind the one end of said crank, the other end being pivotally connected to the rearward portion of said seatrest and a toggle axis being intermediate the ends thereof;
    said motor means being drivingly connected to said toggle link means at the toggle axis thereof;
    whereby the legs and pelvis of the occupant are translated upward and forward from the first position to the second position.

4. A seat according to claim 3 wherein said linkage means further comprises:
    a first connecting rod formed at one end to be pivotally connected to vehicular structure, and the other end being pivotally connected to the upper portion of said middle segment;
    whereby the middle segment reclines as said seat moves from the first position to the second position.

5. A seat according to claim 4 wherein said linkage further comprises:
    a follower rod formed to be pivotally connected at one end to vehicular structure, the other end being pivotally connected to the rear portion of said seatrest; and
    a connecting rod pivotally connected at one end to said follower rod intermediate the ends thereof and pivotally connected to said upper segment;
    whereby the upper segment inclines as said seat moves from the first position to the second position.

6. A seat according to claim 5 wherein said linkage means further comprises:
    a second connecting rod pivotally connected to an extension of said other end of said crank, and pivotally connected at the other end to said legrest intermediate the ends thereof;
    whereby the free end of said legrest reclines as said seat moves from the first position to the second position.

7. A seat according to claim 6 further comprising:
    an armrest fixed to and extending forwardly from said backrest for supporting a handgrip control at the hand position of the occupant.

8. A seat according to claim 1 wherein said linkage means further comprises:
    a first crank formed to be pivotally connected at one end to vehicular structure;
    a first connecting rod pivotally connected at one end to the lower portion of said middle segment and the other end pivotally connected to the other end of said first crank;
    a second crank formed to be pivotally connected at one end to vehicular structure; and
    a second connecting rod pivotally connected at one end intermediate the end portions of said middle segment and pivotally connected at the other end to the other end of said second crank, said first crank and said second connecting rod being pivotally connected intermediate their ends to each other;

said motor means being drivingly connected to said lower segment intermediate the end portions thereof;

whereby the legs and pelvis of the occupant are translated upward and forward from the first position to the second position as the middle segment reclines.

9. A seat according to claim 8 wherein said linkage means further comprises:

a third connecting rod pivotally connected at one end thereof to said second connecting rod intermediate the one end of said second connecting rod and the pivotal connection thereof to said first crank, and the other end of said third connecting rod being pivotally connected to said upper segment;

whereby the upper segment inclines as the seat moves from the first position to the second position.

10. A seat according to claim 9 further comprising:

an armrest pivotally connected at one end to said middle segment intermediate the end portions thereof; and a link pivotally connected at one end to said lower segment intermediate the end portions thereof, and the other end pivotally connected to the other end of said armest;

whereby the hand position of the occupant remains substantially unchanged between the first and second positions of said seat.

11. A seat according to claim 1 wherein said linkage means further comprises:

a crank formed to be pivotally connected at one end to vehicular structure, the other end being pivotally connected to the forward portion of said lower segment;

toggle link means formed to be pivotally connected at one end to vehicular structure behind the one end of said crank, the other end being pivotally connected to the rearward portion of said lower segment, a toggle axis being intermediate the ends thereof;

said motor means being drivingly connected to said toggle link means at the toggle axis thereof;

whereby the legs and pelvis of the occupant are translated upward and forward from the first position to the second position.

12. A seat according to claim 11 wherein said linkage means further comprises:

a first connecting rod formed at one end to be pivotally connected to vehicular structure, and the other end being pivotally connected to the upper portion of said middle segment;

whereby the middle segment reclines as said seat moves from the first position to the second position.

13. A seat according to claim 12 wherein said linkage further comprises:

a follower rod formed to be pivotally connected at one end to vehicular structure, the other end being pivotally connected to the rear portion of said lower segment; and a connecting rod pivotally connected at one end to said follower rod intermediate the ends thereof and pivotally connected to said upper segment;

whereby the upper segment inclines as said seat moves from the first position to the second position.

* * * * *

UNITED STATES PATENT OFFICE
CERTIFICATE OF CORRECTION

Patent No. 3,826,434                                Dated    July 30, 1974

Inventor(s)  Dr. Harald J. Von Beckh

It is certified that error appears in the above-identified patent and that said Letters Patent are hereby corrected as shown below:

On the front page, data element identifier [76] reading:

[76] Inventor:  Harald J. Von Beckh, P. O. Box
                1220, Hatboro, Pa. 18974 should read:

[76] Inventor:  Harald J. Von Beckh, P. O. Box
                1220, Warminster, Pa. 18974

Signed and sealed this 12th day of November 1974.

(SEAL)
Attest:

McCOY M. GIBSON JR.                C. MARSHALL DANN
Attesting Officer                  Commissioner of Patents FORM PO-1050 (10-69)                               USCOMM-DC 60376-P69
                                          ☆ U.S. GOVERNMENT PRINTING OFFICE : 1969 O—366-334